W. H. COLE.
CHICKEN PERCH.
APPLICATION FILED OCT. 10, 1907.
904,472.
Patented Nov. 17, 1908.
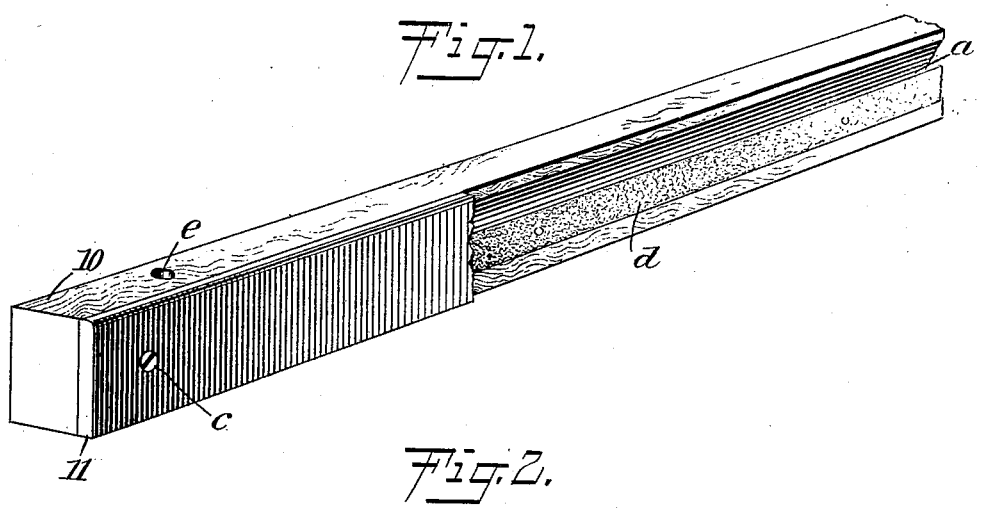
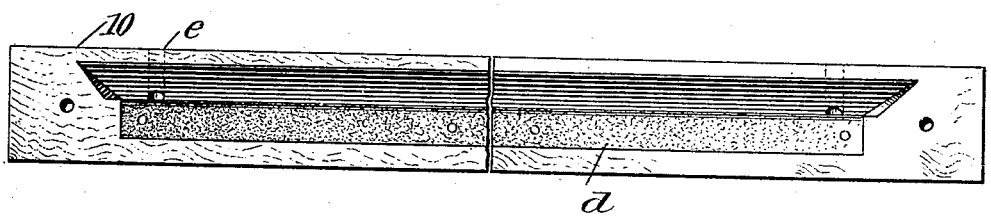
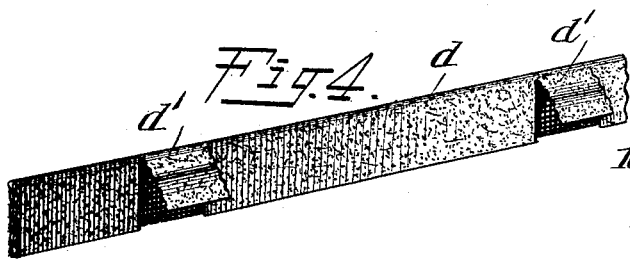
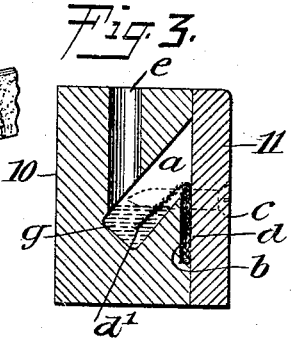
WITNESSES
INVENTOR
William H. Cole
BY
ATTORNEYS

UNITED STATES PATENT OFFICE.

WILLIAM H. COLE, OF BROKEN BOW, NEBRASKA.

CHICKEN-PERCH.

No. 904,472.　　　　Specification of Letters Patent.　　　Patented Nov. 17, 1908.

Application filed October 10, 1907. Serial No. 396,746.

*To all whom it may concern:*

Be it known that I, WILLIAM H. COLE, a citizen of the United States, and a resident of Broken Bow, in the county of Custer and State of Nebraska, have invented a new and Improved Chicken-Perch, of which the following is a full, clear, and exact description.

This invention relates to roost poles or perches, placed in buildings or the like for the accommodation of fowls while roosting; and has for its object to provide novel details of construction for a chicken perch, which adapt it to contain and automatically discharge a graduated quantity of liquid and insecticide, or germicide, from a reservoir in the pole upon the exterior surface, for extermination of lice or mites that infest fowls or growing chickens, and also for the destruction of disease germs.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a perspective view of the improved chicken perch, a portion being broken away for exposure of interior parts; Fig. 2 is a side view of the perch reduced in length, a side wall thereof being removed for display of interior details of construction;
Fig. 3 is a transverse sectional view of the improved perch, showing the construction and relative arrangement of details; and Fig. 4 is a detached perspective view of a fibrous liquid feeder.

The body 10 of the perch is in the form of an elongated wooden bar, preferably rectangular in cross section, and of such thickness as is necessary to insure proper rigidity when occupied by fowls.

A reservoir for liquid insecticide is formed in the body 10, and trends downward and inward from one side of the bar, as shown best in Fig. 3, said reservoir *a* extending lengthwise in the body from points near each end thereof. At the open side of the reservoir *a* and below said reservoir, a shallow recess *b* having a flat bottom, is formed in the body 10 and extends nearly the length of the reservoir *a*. A thin cover board 11 is provided for the closure of the reservoir and is secured on the flat side of the body by screws *c* or equivalent means.

In the recess *b*, that forms a shallow chamber, a fibrous feeder *d* in the form of a strip of wicking, is placed and held slightly compressed by the cover board 11, when said cover is secured in place. The feeder strip *d*, as shown in Figs. 3 and 4, is provided with one or more supplementary feeders *d'* formed or secured thereon, which are arranged to project into the reservoir and be immersed in the liquid contents of the same. The fibrous feeder conveys the liquid from the reservoir to the joint or crevice between the body 10 and cover board 11 from which it passes to the exterior of the perch.

A filling orifice *e* is formed in the top wall of the reservoir *a*, through which a suitable insecticide *g* may be poured and supply the reservoir therewith.

It has been found that if the perch is made of tough, but coarse-grained wood, there is sufficient conductivity afforded by the pores of such wood for transmission of the liquid insect poison to the outer surface of the perch, and the destruction of lice or other vermin that breed on chickens. However as these pores near the surface of the perch may become clogged more or less, it is necessary to provide means for producing a continuous graduated feeding of the liquid from the reservoir to the exterior surface of the perch, and for this purpose the arrangement herein before described by which the liquid is conveyed through the crevice or joint between the body and cover board may be advantageously employed.

It will be seen that the inclined bottom wall of the reservoir *a* affords a convenient support, for the supplementary fibrous feeders *d'* which in suitable numbers and at intervals transfer the liquid from said reservoir to the main feeder *d*. Obviously, the saturation of the feeder *d* will adapt it by gravity to transfer the liquid through the joint or crevice between the body 10 and cover board 11 to the exterior of the perch and thence to the feet of the fowls roosting thereon. By the arrangement described the feeding operation is controlled, so that a proper quantity of the liquid is delivered through the joint or crevice to the outer surface of the perch and a wasteful discharge of the liquid is avoided.

Having thus described my invention, I claim as new and desire to secure by Letters Patent:

1. A perch, comprising an elongated rectangular wooden body, having a reservoir therein that is open at one side, a closure for said open side, a fibrous main feeder held between the body and closure, and a supplementary feeder extending from the reservoir to the main feeder.

2. A perch, comprising an elongated rectangular wooden body, having an elongated reservoir therein open at one side, said body having a flat-bottomed recess in the side through which the reservoir opens, said recess extending below the reservoir opening, a cover board securable on said side for closure of the reservoir, and a fibrous feeder embedded in the recess and pressed by the cover board, the said feeder having a part extending into the reservoir.

3. In a perch of the character described, a rectangular body having a reservoir formed therein that intersects one side of the body and extends downward and transversely therein, the top wall of the said body being provided with a filling opening leading to said reservoir, a cover for the side of the body having the reservoir opening, and means for discharging the liquid by capillary action from said reservoir.

4. In a perch of the character described, a rectangular body having an elongated reservoir therein that intersects one side of the body and thence extends downward and transversely therein, the intersected side of said body having an elongated flat-bottomed recess therein below the reservoir opening.

5. In a perch of the character described, a body having a reservoir formed therein that opens at one side of the body and extends downward and inward from said side forming an inclined bottom wall, the open side of the body having a longitudinally extending recess therein below the reservoir opening, a main fibrous feeder arranged in said recess and having spaced supplementary feeders extending from one side thereof into the reservoir and resting on the inclined bottom wall thereof, and a closure for the open side of the reservoir, the said closure being held in engagement with the main fibrous feeder, the body of the perch being provided with a filling orifice leading to said reservoir.

In testimony whereof I have signed my name to this specification in the presence of two subscribing witnesses.

WILLIAM H. COLE.

Witnesses:
E. TAYLOR,
N. E. ARMSTRONG.